United States Patent
Koopmann

(10) Patent No.: US 10,666,490 B1
(45) Date of Patent: May 26, 2020

(54) METHOD AND APPARATUS FOR ESTIMATION OF A BIT RATE OF A DIGITAL SIGNAL

(71) Applicant: Rohde & Schwarz GmbH & Co. KG, München (DE)

(72) Inventor: Bendix Koopmann, Garching (DE)

(73) Assignee: ROHDE & SCHWARZ GMBH & CO. KG, München (DE)

( * ) Notice: Subject to any disclaimer, the term of this patent is extended or adjusted under 35 U.S.C. 154(b) by 0 days.

(21) Appl. No.: 16/256,605

(22) Filed: Jan. 24, 2019

(51) Int. Cl.
   *H04B 3/46* (2015.01)
   *H04L 27/26* (2006.01)
   *G06F 17/14* (2006.01)
   *H04L 25/02* (2006.01)

(52) U.S. Cl.
   CPC ........ *H04L 27/2695* (2013.01); *G06F 17/142* (2013.01); *H04L 25/0204* (2013.01)

(58) Field of Classification Search
   CPC  H04L 27/2695; H04L 25/0204; G06F 17/142
   USPC .......................... 375/260, 224, 225, 226, 227
   See application file for complete search history.

(56) References Cited

U.S. PATENT DOCUMENTS

| | | | |
|---|---|---|---|
| 2013/0142237 A1* | 6/2013 | Drooghaag | H04B 3/46 375/224 |
| 2017/0278527 A1* | 9/2017 | Sharma | G10L 15/065 |

OTHER PUBLICATIONS

Robert B Randall, "A History of Cepstrum Analysis and its Application to Mechanical Problems", published 2017, Mechanical System and Signal Processing, pp. 1-6.*

* cited by examiner

*Primary Examiner* — Tesfaldet Bocure
(74) *Attorney, Agent, or Firm* — Westman, Champlin & Koehler, P.A.

(57) ABSTRACT

A bit rate estimation apparatus used for estimation of a bit rate, BR, of a digital signal, DS, the bit rate estimation apparatus comprising a data processing unit adapted to determine a regularized cepstrum, CEP, of the digital signal; a peak identification unit adapted to identify a significant peak within the regularized cepstrum, CEP, determined by the data processing unit; and a bit rate determination unit adapted to determine the bit rate of the digital signal, DS, based on the significant peak identified by the peak identification unit.

16 Claims, 10 Drawing Sheets

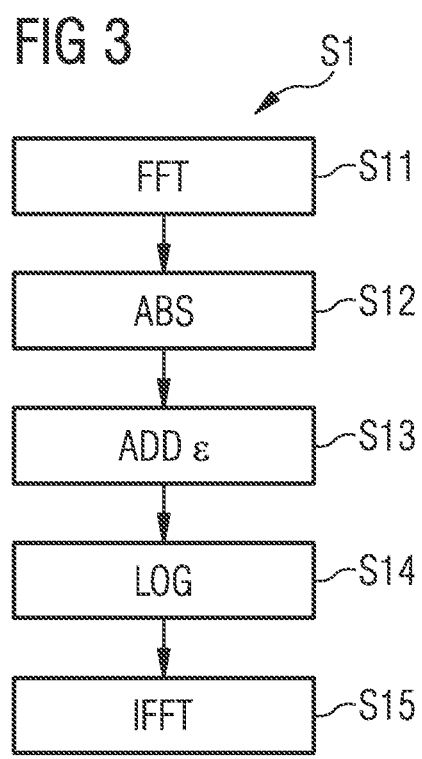

METHOD AND APPARATUS FOR ESTIMATION OF A BIT RATE OF A DIGITAL SIGNAL

TECHNICAL FIELD

The invention relates to a method and apparatus for estimation of a bit rate of a digital signal, in particular of a digital signal applied to a measurement device.

TECHNICAL BACKGROUND

In many use cases, it is necessary to estimate a bit rate of a digital signal. A bit rate is the number of bits that are conveyed or processed per unit of time. In networking and digital telecommunications, a bit rate refers to the per second measurement of data that passes through a communication channel of a communication network. In this context, a bit rate is synonymous with data transfer rate DTR. For multimedia encoding, a bit rate refers to the number of bits used per unit of playback time such as video or audio after data compression or encoding. Multimedia size and output quality often depends on the bit rate used during encoding. The speed at which audio and video size are encoded (compressed) can be measured in bits per second (bit rate). The speed at which data can be transferred within a computer or between a peripheral device and a computer can be measured in bytes per second indicating a data transfer rate. In digital communication systems, at the physical layer, the raw bit rate or gross rate comprises the total number of physically transferred bits per second over a communication link, including useful data as well as protocol overhead data. A gross bit rate is related to the symbol or modulation rate which is expressed in bauds or symbols per second. At the physical layer, the net bit rate of a digital communication channel is the capacity excluding the physical layer protocol overhead data such as time division multiplex framing bits or redundant forward error correction codes.

With increasing transfer rates and lower jitter margins, the performance of clock generation and recovery circuits becomes more important. The relevant factor in measuring jitter in general and jitter transfer in particular comprises the observed jitter transfer function of an instrument. Measuring devices, in particular oscilloscopes, are used for measuring jitter. Phase-locked loops can be used for digital estimations of signal rates or data transfer rates. Further, a bit rate can be estimated by counting signal flanks of digital signals. However, conventional bit rate estimation circuits provide a limited precision and are not robust against signal noise or signal disturbances, in particular at very high data transfer rates. Accordingly, there is a need to provide a method and apparatus providing a precise estimation of a bit rate of a digital signal even in a noisy environment.

SUMMARY OF THE INVENTION

The invention provides according to a first aspect a method for estimation of a bit rate of a digital signal, the method comprising the steps of:
determining a regularized cepstrum of the digital signal;
identifying at least one significant peak within the provided regularized cepstrum and
determining the bit rate of the digital signal based on the identified significant peak within the regularized cepstrum of the digital signal.

In a possible embodiment of the method for estimation of a bit rate of a digital signal according to the first aspect of the present invention, the regularized cepstrum of the digital signal is determined by performing the substeps of
performing a fast Fourier transformation, FFT, of the digital signal to provide a Fourier transform of the digital signal,
calculating an absolute value of the provided Fourier transform of the digital signal,
adding an epsilon value to the calculated absolute value of the provided Fourier transform of the digital signal to provide an intermediate sum value,
calculating a logarithm of the provided intermediate sum value to provide a regularized absolute spectrum and
performing an inverse fast Fourier transformation, IFFT, of the provided regularized absolute spectrum to generate the regularized cepstrum of the digital signal.

In a possible embodiment of the method for estimation of a bit rate of a digital signal according to the first aspect of the present invention, in the determined regularized cepstrum of the digital signal, a first significant peak representing a pulse width is identified.

In a possible embodiment of the method for estimation of a bit rate of a digital signal according to the first aspect of the present invention, the first significant peak in the regularized cepstrum of the digital signal is identified by performing Gauss fitting.

In a still further possible embodiment of the method for estimation of a bit rate of a digital signal according to the first aspect of the present invention, the inverse of the identified pulse width is calculated to determine the bit rate of the digital signal.

In a still further possible embodiment of the method for estimation of a bit rate of a digital signal according to the first aspect of the present invention, the digital signal is received via a data transmission channel in a data stream.

In a still further possible embodiment of the method for estimation of a bit rate of a digital signal according to the first aspect of the present invention, data samples of the received digital signal within a time window are stored in a data buffer and processed to determine the regularized cepstrum of the digital signal.

In a still further possible embodiment of the method for estimation of a bit rate of a digital signal according to the first aspect of the present invention, a negative of the regularized cepstrum is determined before identifying the significant peak.

In a still further possible embodiment of the method for estimation of a bit rate of a digital signal according to the first aspect of the present invention, a squared magnitude of the calculated absolute value is calculated before adding the epsilon value to provide the intermediate sum value used to calculate the regularized absolute spectrum.

The invention further provides according to a second aspect a bit rate estimation apparatus used for estimation of a bit rate of a digital signal,
said bit rate estimation apparatus comprising
a data processing unit adapted to determine a regularized cepstrum of the digital signal,
a peak identification unit adapted to identify a significant peak within the regularized cepstrum determined by said data processing unit and
a bit rate determination unit adapted to determine a bit rate of the digital signal based on the significant peak identified by the peak identification unit.

In a possible embodiment of the bit rate estimation apparatus according to the second aspect of the present invention, the data processing unit is adapted to perform a fast Fourier transformation of the digital signal to provide a Fourier transform of the digital signal, to calculate an absolute value of the provided Fourier transform of the digital signal,
to add an epsilon value to the calculated absolute value of the provided Fourier transform of the digital signal to provide an intermediate sum value,
to calculate a logarithm of the provided intermediate sum value to provide a regularized absolute spectrum and
to perform an inverse fast Fourier transformation, IFFT, of the provided regularized absolute spectrum to generate the regularized cepstrum of the digital signal.

In a possible embodiment of the bit rate estimation apparatus according to the second aspect of the present invention, the peak identification unit is adapted to identify in the regularized cepstrum of the digital signal a first significant peak representing a pulse width.

In a further possible embodiment of the bit rate estimation apparatus according to the second aspect of the present invention, the first significant peak in the regularized cepstrum of the digital signal is identified by said peak identification unit by performing Gauss fitting.

In a further possible embodiment of the bit rate estimation apparatus according to the second aspect of the present invention, the bit rate determination unit is adapted to calculate the inverse of the pulse width identified by said peak identification unit to determine an estimate bit rate of the digital signal.

In a still further possible embodiment of the bit rate estimation apparatus according to the second aspect of the present invention, the apparatus comprises a data buffer to receive and store data samples within a time window of a received digital signal.

The invention further provides according to a third aspect a measurement device for measuring digital signals, said measuring device comprising at least one bit rate estimation apparatus used for estimation of a bit rate of a digital signal applied to said measurement device, wherein said bit rate estimation apparatus comprises
a data processing unit adapted to determine a regularized cepstrum of the digital signal,
a peak identification unit adapted to identify a significant peak within the regularized cepstrum determined by said data processing unit and
a bit rate determination unit adapted to determine the bit rate of the digital signal based on the significant peak identified by the peak identification unit.

BRIEF DESCRIPTION OF FIGURES

In the following, possible embodiments of the different aspects of the present invention are described in more detail with reference to the enclosed figures.

FIG. 3 shows a further flowchart for illustrating substeps during the determination of a regularized cepstrum of a digital signal performed in the method illustrated in FIG. 2;

DETAILED DESCRIPTION OF EMBODIMENTS

Figure 1:
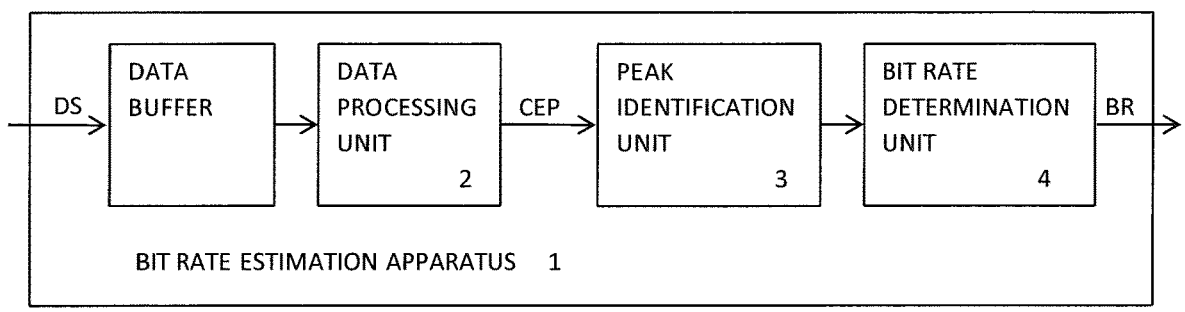
FIG. 1 shows a block diagram of a possible exemplary embodiment of a bit rate estimation apparatus according to an aspect of the present invention.

FIG. 1 shows a block diagram of a possible exemplary embodiment of a bit rate estimation apparatus 1 according to an aspect of the present invention. In the illustrated exemplary embodiment, the bit rate estimation apparatus 1 comprises three main subunits. The bit rate estimation apparatus 1 comprises in the illustrated embodiment of FIG. 1 a data processing unit 2, a peak identification unit 3 and a bit rate determination unit 4. The data processing unit 2 is adapted to determine a regularized cepstrum CEP of a received digital signal DS as illustrated in FIG. 1. In a possible embodiment, the data processing unit 2 first performs a fast Fourier transformation FFT of the received digital signal DS to provide a Fourier transform of the respective digital signal DS. The data processing unit 2 is further adapted to calculate an absolute value of the provided Fourier transform of the received digital signal DS. The data processing unit 2 adds an epsilon value c to the calculated absolute value of the provided Fourier transform of the digital signal DS to provide an intermediate sum value. Further, a logarithm of the provided intermediate sum value is calculated to provide a regularized absolute spectrum. Finally, the data processing unit 2 performs an inverse fast Fourier transformation of the provided regularized absolute spectrum to generate a regularized cepstrum CEP of the digital signal DS as illustrated in FIG. 1. The data processing unit 2 can be implemented in a possible embodiment as a hardware module.

The generated regularized cepstrum CEP is applied to the peak identification unit 3 of the bit rate estimation apparatus 1 as shown in FIG. 1. The peak identification unit 3 is adapted to identify a significant peak within the regularized cepstrum CEP determined by said data processing unit 2. In a possible embodiment, the significant peak within the regularized cepstrum CEP determined by the data processing unit 2 comprises the first peak within the regularized cepstrum CEP. The peak identification unit 3 is adapted in a possible embodiment to identify in the regularized cepstrum CEP of the digital signal DS a first significant peak representing a pulse width. In a possible embodiment, the first significant peak in the regularized cepstrum CEP of the digital signal DS is identified by the peak identification unit 3 of the bit rate estimation apparatus 1 by performing Gauss fitting.

The bit rate determination unit 4 of the bit rate estimation apparatus 1 is adapted to determine the bit rate BR of the digital signal DS based on the significant peak identified by the peak identification unit 3. In a possible embodiment, the bit rate determination unit 4 is adapted to calculate the inverse of the pulse width identified by the peak identification unit 3 to determine an estimate bit rate of the digital signal DS.

In a possible embodiment, the digital signal DS is received via a signal transmission channel. The digital signal DS can be communicated on a wired or wireless signal transmission channel. The received digital signal DS can be stored in a possible embodiment first in a data buffer of the bit rate estimation apparatus 1 for being processed by the data processing unit 2. The data buffer is adapted to receive and store data samples within a time window of the received digital signal DS. In a possible embodiment, the bit rate estimation apparatus 1 as illustrated in the block diagram of FIG. 1 can be integrated in a measurement device used for measuring digital signals DS. The measurement device can comprise one or more bit rate estimation apparatuses 1 as illustrated in the block diagram of FIG. 1. In a possible embodiment, the measurement device comprises for each data transmission channel an associated bit rate estimation apparatus 1 as illustrated in FIG. 1. In an alternative embodiment, the measurement device can comprise a switching unit adapted to switch digital signals DS to the bit rate estimation apparatus 1 for estimation of their respective bit rates.

Figure 2:
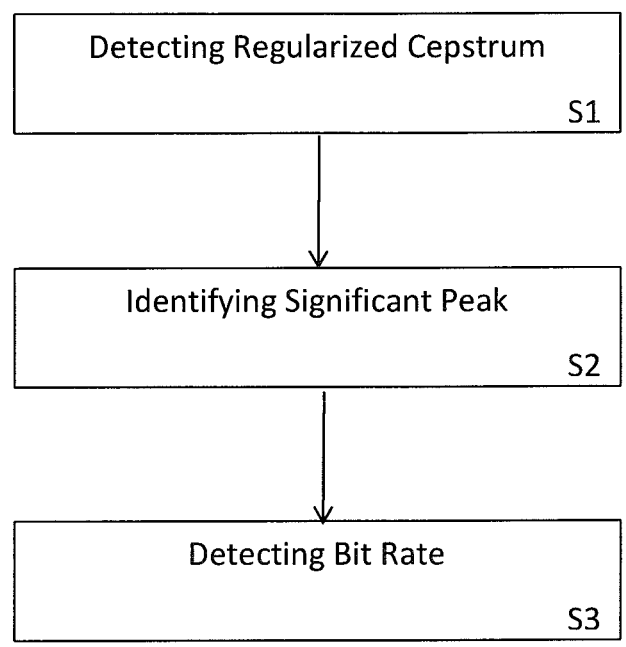
FIG. 2 shows a flowchart of a possible exemplary embodiment of a method for estimation of a bit rate of a digital signal according to a further aspect of the present invention.

FIG. 2 shows a flowchart of a possible exemplary embodiment of a method for estimation of a bit rate or a data transfer rate of a digital signal DS according to an aspect of the present invention. In the illustrated exemplary embodiment, the method comprises three main steps S1, S2, S3.

In a first step S1, a regularized cepstrum CEP for the digital signal DS is determined. In a possible embodiment, a received digital signal DS is processed by a processing unit such as the data processing unit 2 illustrated in FIG. 1 for determining automatically a regularized cepstrum CEP of the digital signal DS.

In a further step S2, at least one significant peak within the provided regular cepstrum CEP is identified. In a possible embodiment, in the regularized cepstrum CEP determined in step S1, a first significant peak representing a pulse width is identified. The first significant peak in the regular cepstrum CEP can be identified in a possible embodiment by performing Gauss fitting.

In a further step S3, the bit rate BR of the digital signal DS is determined based on the significant peak in the regularized cepstrum CEP of the digital signal DS identified in step S2. In a possible embodiment, the inverse of the identified pulse width is calculated to determine the bit rate BR of the digital signal DS. In a possible embodiment, the digital signal DS evaluated by the method illustrated in FIG. 2 is received via a data transmission channel of a data stream. The data samples of the received digital signal DS within a time window can be stored in a data buffer and then processed in step S1 to determine the regularized cepstrum CEP of the digital signal DS. In a possible embodiment, a negative of the regularized cepstrum CEP is determined before identifying the significant peak within the regularized cepstrum CEP in step S2.

FIG. 3 shows a further flowchart for illustrating substeps during the determination of a regularized cepstrum CEP of the digital signal DS, i.e. in step S1 illustrated in the flowchart of FIG. 2. In the illustrated embodiment of FIG. 3, the determination of the regularized cepstrum CEP of the digital signal DS is performed by five substeps S11, S12, S13, S14 and S15.

In a first substep S11, a fast Fourier transformation FFT of the digital signal DS is performed to provide a Fourier transform of the digital signal DS.

In a further substep S12, an absolute value of the provided Fourier transform of the digital signal DS is calculated.

In a further substep S13, an absolute value c is added to the calculated absolute value of the provided Fourier transform of the digital signal DS to provide an intermediate sum value.

In a further substep S14, a logarithm of the provided intermediate sum value is calculated to provide a regularized absolute spectrum.

In a further step S15, an inverse fast Fourier transformation IFFT of the provide regularized absolute spectrum is performed to generate the regularized cepstrum CEP of the digital signal DS.

In a possible implementation of the method illustrated in FIGS. 2, 3, a square magnitude of the calculated absolute value can be calculated before adding the epsilon value c to provide the intermediate sum value in step S13 used to calculate the regularized absolute spectrum. Adding of the epsilon value c to the absolute Fourier spectrum can avoid errors before calculating the logarithm.

The determination of regularized cepstrum CEP of the digital signal DS within the method of determination of a bit rate BR of the digital signal DS has the significant advantage that no clock signal is needed. The method and apparatus 1 according to the present invention has the advantage that no clock data recovery is necessary.

In a possible embodiment, the method for estimation of a bit rate BR of a digital signal DS can be implemented in a software module. In this specific embodiment, the method comprises a computer-implemented method executed on at least one processor of a data processing unit such as the data processing unit 2 illustrated in FIG. 1. The peak identification unit 3 can also comprise a software module performing the substeps required for peak identification. The bit rate determination unit 4 can also comprise at least one software module adapted to perform calculation steps to determine a bit rate BR based on the identified significant peak within the regularized cepstrum CEP of the digital signal DS. The method according to the present invention provides the advantage that the bit rate BR of a digital signal can be estimated very fast and even in a noisy signal environment.

By means of the determined regularized cepstrum CEP, a basic frequency as a sort of smallest common divisor is generated. In this manner, the whole received digital signal DS can be taken into account to achieve a more robust estimation of the bit rate BR of the respective digital signal DS. This basic frequency can even be determined if there are only a few signal flanks (signal edges) of a received digital signal DS, e.g. only two to three clocks. Glichtes, i.e. very small peaks in the cepstrum CEP, can be ignored since the energy and regularity are not given for a high peak in the cepstrum CEP. Signal jitter does provide for a less local impulse in the regularized cepstrum CEP which can be detected. The method does not require any initial estimation and a basic frequency or basic noise of pulse width enables still a reliable and robust estimation of the correct bit rate.

The data processing unit 2 of the bit rate estimation apparatus 1 as illustrated in FIG. 1 is adapted in a preferred embodiment to perform the substeps illustrated in the flowchart of FIG. 3. The data processing unit 2 calculates a regularized cepstrum CEP of the received digital signal DS. The determined cepstrum CEP represents a power spectrum. The cepstrum CEP can be defined as a function of pseudotime, i.e. a spectrum ripple of frequency or quefrency. The independent variable of the spectral graph of the cepstrum CEP is called quefrency.

The spectral density of a signal with an echo has the form of an envelope (the spectrum of the original signal) that does modulate a periodic function or a frequency (the spectrum contribution of the echo). The spectrum of the log spectrum shows a peak when the original time waveform contains an echo. The spectrum of the log of the spectrum of a time waveform forms the cepstrum CEP of the signal.

In a possible embodiment, the regularized cepstrum CEP of the digital signal DS is calculated as follows:

$$CEP = F^{-1}\{\log(|F\{f(t)\}| + \varepsilon)\}, \quad (1)$$

wherein f(t) is the time signal,
F represents the Fourier transformation,
$F^{-1}$ represents the inverse Fourier transformation and
E represents an added epsilon value.

In a possible embodiment, a square magnitude of the calculated absolute value is calculated before adding the epsilon value c to provide the intermediate sum value used to calculate the regularized absolute spectrum as follows:

$$CEP = F^{-1}\{\log(|F\{f(t)\}|^2 + \varepsilon)\} \quad (2)$$

All information about the basic pulse width of the signal is encoded within the calculated cepstrum CEP. Also, a longer pulse width can be used to find the basic pulse width. Accordingly, the calculated cepstrum CEP uses all available signal information of the received digital signal DS. This allows to identify a basic pulse width even if the received digital signal DS does comprise a poor signal quality.

Figure 4A:
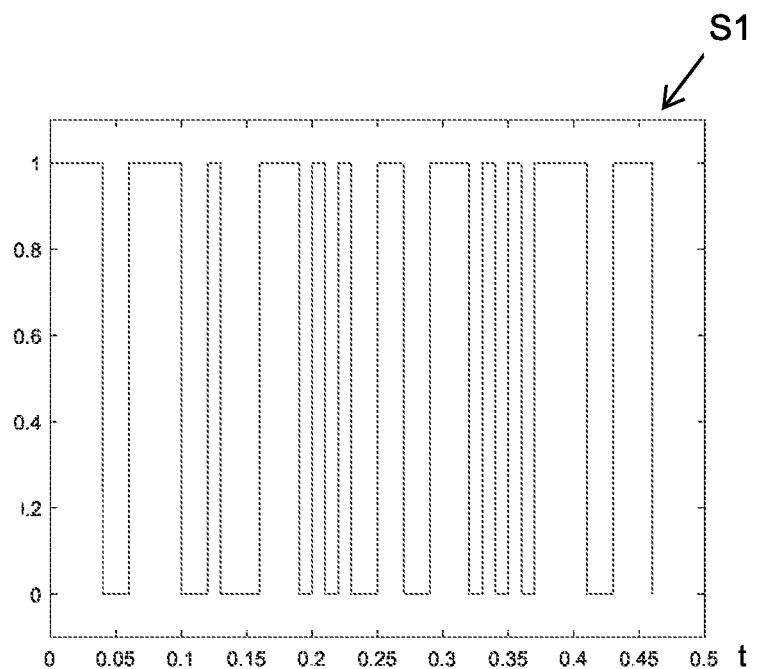
FIGS. 4A, 4B show diagrams to illustrate the determination of a regularized cepstrum of a digital signal as employed by a method and apparatus according to the present invention.
Figure 4B:
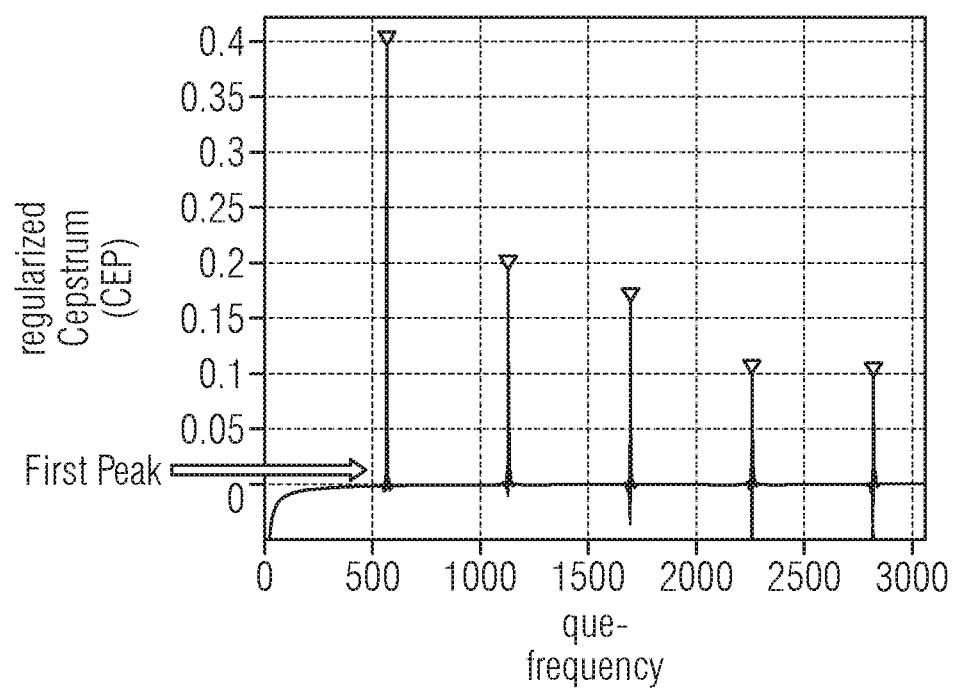

FIGS. 4A, 4B illustrate the determination of a regularized cepstrum CEP of a digital signal DS. FIG. 4A shows a waveform of a digital signal DS in the time domain. The digital signal DS comprises a sequence of data bits having a high logical value 1 and a low logical value 0 as illustrated in FIG. 4A.

FIG. 4B illustrates the corresponding regularized cepstrum CEP derived from the digital signal DS shown in FIG. 4A. As shown in FIG. 4B, the regularized cepstrum CEP comprises several peaks wherein the first significant peak of the cepstrum CEP can be used in a possible implementation for determination of the bit rate of the digital signal DS. In a possible embodiment, at least one significant peak within the regularized cepstrum CEP is identified. In a preferred embodiment, the first significant peak representing the pulse width can be identified as shown in FIG. 4B. In a possible embodiment, a first positive significant peak is identified by performing Gauss fitting.

Figure 5A:
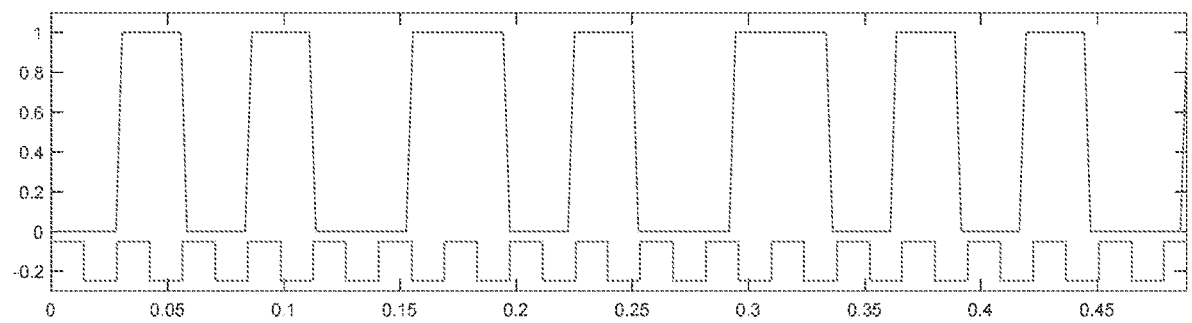
FIGS. 5A, 5B show further diagrams for illustrating the operation of a method and apparatus according to the present invention.
Figure 5B:
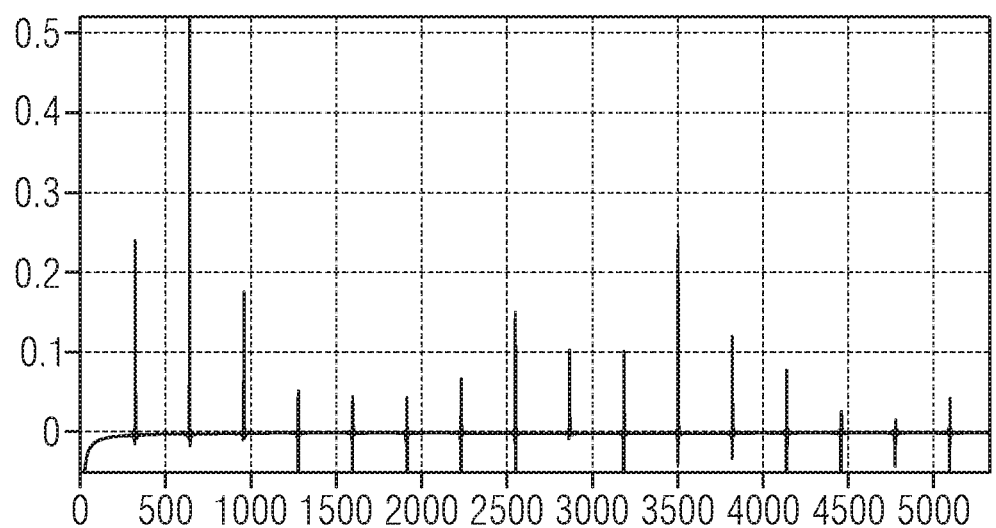

FIGS. 5A, 5B further illustrate the operation of the method and apparatus 1 according to the present invention. FIG. 5A shows a digital signal DS in the time domain. FIG. 5B illustrates the corresponding cepstrum CEP of the signal illustrated in FIG. 5A. In the illustrated example, the digital signal DS comprises pulses with a pulse width with a length 2 or 3. Although there are no pulses with the length 1. The plurality of pulses with a pulse width having a length of 2 or 3 UI allows the conclusion that the basic length is UI=1.

As can be seen in FIG. 5B, the basic frequency can be determined from the derived cepstrum CEP.

Figure 6C:
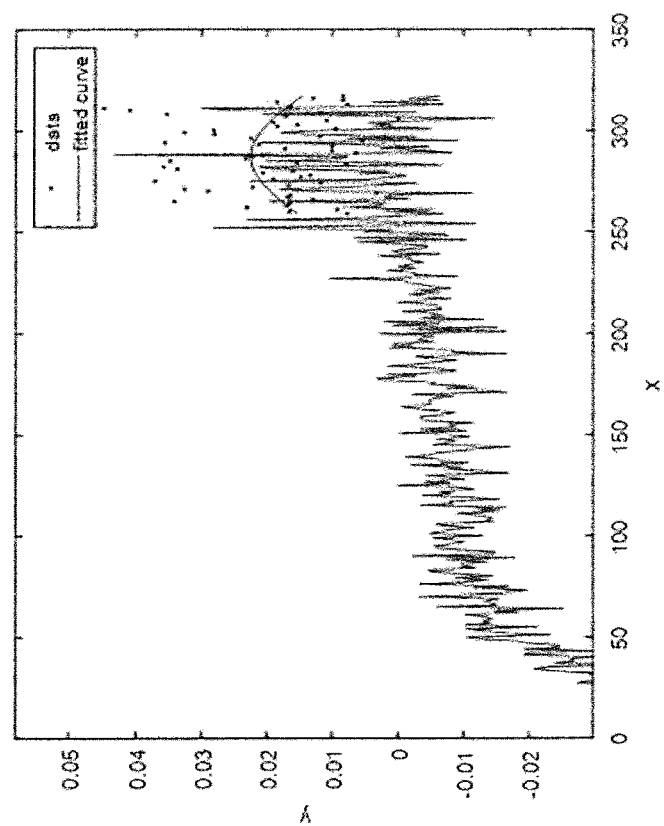
FIGS. 6A, 6B, 6C show further diagrams for illustrating a possible exemplary embodiment of a method and apparatus for estimation of a bit rate of a digital signal according to the present invention.
Figure 6A:
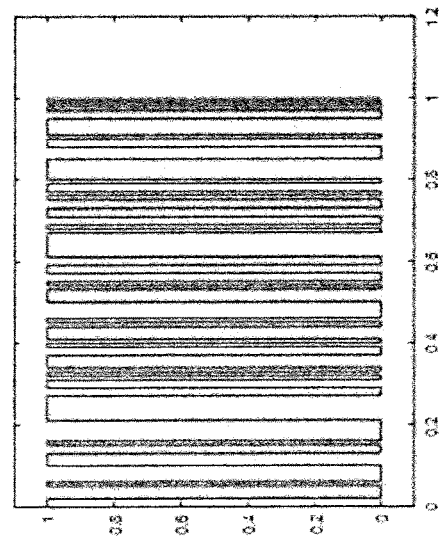
Figure 6B:
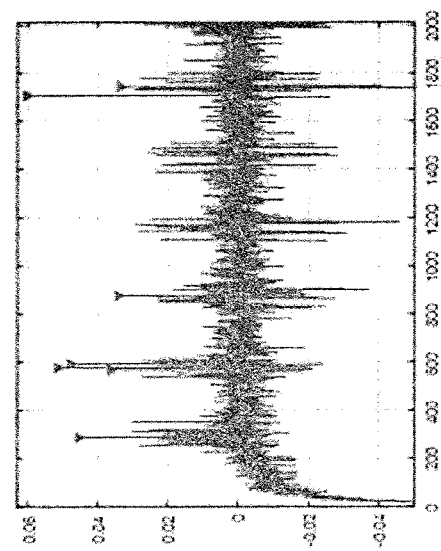

FIGS. 6A, 6B, 6C show a further example illustrating the operation of a method and apparatus 1 according to the present invention. FIG. 6A shows a digital signal DS in the time domain comprising a stream of digital bits. In the illustrated example, there is some signal noise at the signal flanks of the digital signal waveform.

FIG. 6B illustrates the corresponding cepstrum CEP wherein the noise of the digital signal causes a noisy shape of the peaks within the cepstrum CEP as illustrated in FIG. 6B.

FIG. 6C illustrates the peak detection using Gauss fitting. Consequently, even signals of poor quality allow to detect significant peaks within the determined cepstrum CEP of the digital signal DS.

Figure 7:
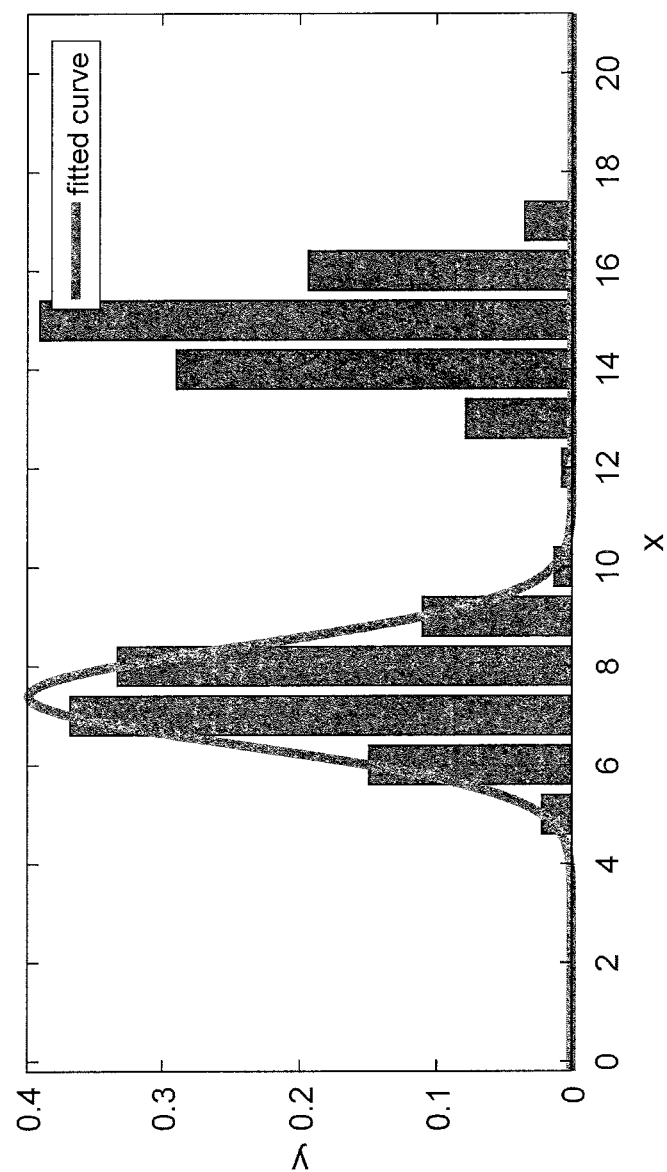
FIG. 7 shows a diagram for illustrating a possible exemplary embodiment of a method and apparatus for estimation of a bit rate of a digital signal according to the present invention using Gauss fitting.

FIG. 7 shows a further diagram for illustrating an embodiment wherein a significant peak in the regularized cepstrum CEP of the digital signal DS is identified by performing Gauss fitting. Through the number of bins/samples of FFT, the maximal precision is limited. By performing interpolation on the basis of a distribution, it is possible to determine the real position of a peak with a considerable precision since not only the highest bin but all bins of a peak are taken into account.

Figure 8:
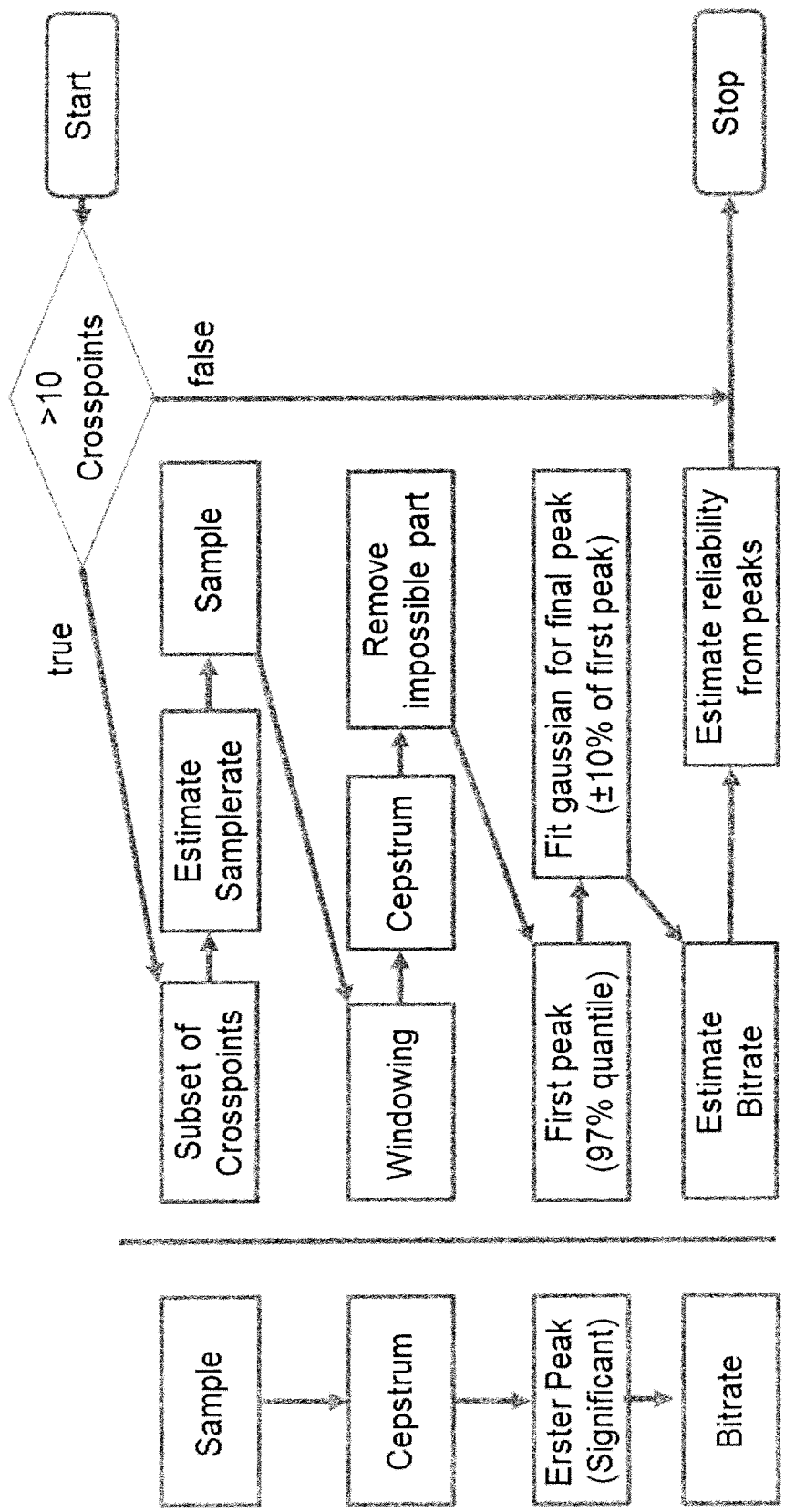
FIG. 8 shows a flowchart illustrating a possible exemplary implementation of a method and apparatus for estimation of a bit rate of a digital signal according to the present invention.

FIG. 8 shows a flowchart of a possible exemplary embodiment of a method and apparatus 1 according to an aspect of the present invention.

As illustrated in FIG. 8, a first subset of cross points within the received digital signal DS is determined to estimate a sample rate for sampling the received signal. The received samples can be stored in a buffer of a predetermined size. Data samples of the received digital signal DS within a predetermined time window can be stored in the data buffer and processed to determine the regularized cepstrum CEP of the received signal as illustrated in FIG. 8. The cepstrum CEP can be processed to remove less relevant portions and to identify a significant first peak within the regularized cepstrum CEP. Gauss fitting can be performed for the identified peak as also illustrated in FIG. 7. The bit rate BR can be calculated on the identified significant peak of the regularized spectrum as shown in FIG. 8. In a possible embodiment, the reliability of the estimated bit rate BR can be calculated from the peaks of the regularized cepstrum CEP. The estimated reliability of the calculated bit rate BR can also be output by the bit rate estimation apparatus 1 in a possible implementation. The method for estimation of a bit rate BR of the digital signal DS as also illustrated in the exemplary embodiment of FIG. 8 is very robust against noise and environmental impacts on the signal. The calculated regularized cepstrum CEP uses all information carried by the respective digital signal DS. An implemented algorithm allows to estimate and/or calculate the bit rate of the received digital signal very fast.

In a possible embodiment of the bit rate estimation apparatus 1, the regularized cepstrum CEP calculated by the data processing unit 2 can be output via a graphical user interface along with the calculated bit rate BR of the digital signal DS. For instance, a measurement device comprising a bit rate estimation apparatus 1 as illustrated in FIG. 1 can comprise a graphical user interface or display adapted to display a regularized cepstrum CEP as shown in FIGS. 4B, 5B and FIG. 6C along with the calculated estimated bit rate BR of the respective digital signal DS.

The invention claimed is:

1. A method for estimation of a bit rate, BR, of a digital signal, DS, the method comprising the steps of:
   determining a regularized cepstrum, CEP, of the digital signal, DS;
   identifying at least one significant peak within the provided regularized cepstrum, CEP; and
   determining the bit rate, BR, of the digital signal based on the identified significant peak within the regularized cepstrum, CEP, of the digital signal, DS.

2. The method according to claim 1 wherein the regularized cepstrum, CEP, of the digital signal, DS, is determined by performing the following substeps:
   performing a fast Fourier transformation, FFT, of the digital signal to provide a Fourier transform of the digital signal, DS;
   calculating an absolute value of the provided Fourier transform of the digital signal;
   adding an epsilon value, ε, to the calculated absolute value of the provided Fourier transform of the digital signal to provide an intermediate sum value;

calculating a logarithm of the provided intermediate sum value to provide a regularized absolute spectrum; and performing an inverse fast Fourier transformation, IFFT, of the provided regularized absolute spectrum to generate the regularized cepstrum, CEP, of the digital signal, DS.

3. The method according to claim 1 wherein in the determined regularized cepstrum, CEP, of the digital signal, DS, a first significant peak representing a pulse width is identified.

4. The method according to claim 3 wherein the first significant peak in the regularized cepstrum, CEP, of the digital signal, DS, is identified by performing Gauss fitting.

5. The method according to claim 3 wherein the inverse of a signal representing the identified pulse width is calculated to determine the bit rate, BR, of the digital signal, DS.

6. The method according to claim 1 wherein the digital signal, DS, is received via a data transmission channel in a data stream.

7. The method according to claim 6 wherein data samples of the received digital signal, DS, within a time window are stored in a data buffer and processed to determine the regularized cepstrum, CEP, of the digital signal, DS.

8. The method according to claim 1 wherein negative values of the regularized cepstrum, CEP, are determined before identifying the significant peak.

9. The method according to claim 2 wherein a squared magnitude of the calculated absolute value is calculated before adding the epsilon value, ε, to provide the intermediate sum value used to calculate the regularized absolute spectrum.

10. A bit rate estimation apparatus used for estimation of a bit rate, BR, of a digital signal, DS, said bit rate estimation apparatus comprising:

a data processing unit adapted to determine a regularized cepstrum, CEP, of the digital signal;

a peak identification unit adapted to identify a significant peak within the regularized cepstrum, CEP, determined by said data processing unit; and a bit rate determination unit adapted to determine the bit rate of the digital signal, DS, based on the significant peak identified by the peak identification unit.

11. The bit rate estimation apparatus according to claim 10 wherein the data processing unit is adapted to perform a fast Fourier transformation, FFT, of the digital signal, DS, to provide a Fourier transform of the digital signal;

to calculate an absolute value of the provided Fourier transform of the digital signal, DS;

to add an epsilon value, ε, to the calculated absolute value of the provided Fourier transform of the digital signal to provide an intermediate sum value;

to calculate a logarithm of the provided intermediate sum value to provide a regularized absolute spectrum; and to perform an inverse fast Fourier transformation, IFFT, of the provided regularized absolute spectrum to generate the regularized cepstrum, CEP, of the digital signal, DS.

12. The bit rate estimation apparatus according to claim 10 wherein the peak identification unit is adapted to identify in the regularized cepstrum, CEP, of the digital signal, DS, a first significant peak representing a pulse width.

13. The bit rate estimation apparatus according to claim 12 wherein the first significant peak in the regularized cepstrum, CEP, of the digital signal, DS, is identified by said peak identification unit by performing Gauss fitting.

14. The bit rate estimation apparatus according to claim 10 wherein the bit rate determination unit is adapted to calculate the inverse of a signal representing the pulse width identified by said peak identification unit to determine an estimate bit rate, BR, of the digital signal, DS.

15. The bit rate estimation apparatus according to claim 10 comprising a data buffer to receive and store data samples within a time window of a received digital signal, DS.

16. A measurement device for measuring digital signals, said measuring device comprising at least one bit rate estimation apparatus used for estimation of a bit rate, BR, of a digital signal, DS, applied to said measurement device, wherein said bit rate estimation apparatus comprises a data processing unit adapted to determine a regularized cepstrum, CEP, of the digital signal, a peak identification unit adapted to identify a significant peak within the regularized cepstrum, CEP, determined by said data processing unit and a bit rate determination unit adapted to determine the bit rate BR of the digital signal based on the significant peak identified by the peak identification unit.

* * * * *